United States Patent [19]

Tounai et al.

[11] Patent Number: 4,998,830
[45] Date of Patent: Mar. 12, 1991

[54] DEVICE FOR SUPPORTING ARM DRIVING SHAFTS OF INDUSTRIAL ROBOT

[75] Inventors: Syuichi Tounai; Toshiaki Iwanaga, both of Kitakyushu, Japan

[73] Assignee: Kabushiki Kaisha Yaskawa Denki Seisakusho, Fukuoka, Japan

[21] Appl. No.: 416,135

[22] Filed: Oct. 3, 1989

[30] Foreign Application Priority Data

Oct. 7, 1988 [JP] Japan ................... 63-131943[U]

[51] Int. Cl.$^5$ .................... F16C 19/36; B25J 17/00
[52] U.S. Cl. .................... 384/563; 74/479; 384/571; 384/584; 384/585; 901/28
[58] Field of Search ............... 384/559, 562, 563, 564, 384/571, 583, 584, 585; 414/917; 901/15, 28; 74/479

[56] References Cited

U.S. PATENT DOCUMENTS 3,943,803  3/1976  Hafla ................... 384/563 X
4,627,786  12/1986  Minematsu et al. ........... 414/917 X Primary Examiner—Stuart S. Levy
Assistant Examiner—William G. Battista, Jr.
Attorney, Agent, or Firm—Beverdige, DeGrandi & Weilacher

[57] ABSTRACT

In a device for supporting arm driving shafts, articulating portions of adjacently provided first and second arms constituting a parallel link type robot are rotatably supported, via separately provided bearings, from supporting posts projecting from the robot structure, and the first arm and second arm are also coupled through another bearing. All of these bearings are of a type in which an axial force applied to either one of inner and outer races of the bearing beforehand presses rolling members of the bearing toward the other of the races, while a pressing plate is provided for applying the axial force to one of the bearings. The application of the axial force shifts the supporting frame of the first arm relative to the driving shaft of the second arm, so that all of the bearings are prepressurized for eliminating unnecessary play.

7 Claims, 4 Drawing Sheets

DEVICE FOR SUPPORTING ARM DRIVING SHAFTS OF INDUSTRIAL ROBOT

BACKGROUND OF THE INVENTION

This invention relates to articulations of an industrial robot, and more particularly to a device for supporting the driving shafts of parallel linked first and second arms into axial alignment, and applying a pressure prior to the operation of the robot.

In a case where the driving shafts of a first arm and a second arm of a parallel-linked construction are arranged in axial alignment, and operated in high precision, a prepressurizing control is required for eliminating play of the bearings which support the driving shafts of arms from the base structure of the robot.

For instance, in a conventional robot shown in FIG. 5, a parallel link construction is formed by a first arm A, second arm B, third arm C and a fourth arm D, and the driving shafts of the first arm A and the second arm B are rotatably supported by a pair of supporting posts F projecting from the base structure of the robot. FIG. 6 is a cross-sectional view taken along the line X—X in FIG. 5. In this drawing, numerals 1 and 2 designate the supporting posts, numeral 3 designates the first arm, one end of which is secured to .or formed into a frame structure 4 extended between the supporting posts. Numeral 5 designates a driving motor for driving the first arm 3. The driving motor 5 rotates a driving shaft 7 of the first arm 3 through a speed-reduction mechanism 6. The driving shaft 7 is coupled to the supporting frame 4 of the first arm 3. Numeral 8 designates a bearing through which the supporting frame 4 is supported from the supporting post 1. The bearing 8 is preferably made of a cross-roller bearing which is described hereinafter in more detail with reference to FIG. 6(a). The bearing 8 has an inner race fixed to the supporting frame 4, while the outer race thereof is divided into two pieces for applying a pressure to a rolling member of a cross-roller shape. Numeral 9 designates a pressing plate adjustably secured to an appropriate position of the supporting post 1 by means of adjusting screws 10. The plate 9 presses one of two pieces of the outer race to the other. Numeral 10a designates a securing ring which secures the inner race of the bearing 8 onto the supporting frame 4. In the conventional construction shown in FIG. 6, another driving motor 12 is mounted on the supporting post 2 for driving a driving shaft 14 of the second are 11 through another speed-reduction mechanism 13. The driving shaft 14 is rotatably supported by the supporting post 2 through another bearing 15 similar to the bearing 8. The inner race of the bearing 15 is fixed to the driving shaft 14, while the outer race divided into two pieces is secured to the supporting post 2. Another pressurizing plate 16 is adjustably secured to the supporting post 2 by means of adjusting screws 17 so that one of the two pieces of the outer race is pressed toward the other. Still another bearing 18 of an ordinary construction is provided for supporting one end of the supporting frame 4 on the circumferential surface of the driving shaft 14.

The supporting frame 4 of the first arm 3 provided between the supporting posts 1 and 2 has one end coupled to the driving shaft 7 and supported through the bearing 8 by the supporting post 1, and the other end supported through the bearing 18 by the driving shaft 14 of the second arm 11. The driving shaft 14 of the second arm 11 is in turn supported through the bearing 15 by the supporting post 2. In order to impart rigidity to the supporting mechanism of the first arm 3 and the second arm 11 and to assure a precision operation of the mechanism, it is required to remove excessive play of the bearings 8 and 15. However, the inner races of the bearings 8 and 15 are fixed to supporting frame 4 and the driving shaft 14, respectively, and therefore one of the two pieces of the divided outer races of the bearings 8 and 15 must be pressed toward the other by the pressurizing plates 9 and 16 which are adjustably secured to the supporting posts 1 and 2 by means of machine screws 10 and 17.

One example of the cross roller bearing used for such purpose is illustrated in FIG. 6a. In the drawing, numeral 81 designates an inner race, 82a and 82b designate an outer race divided into two pieces, and numeral 83 designates a cross roller of a ring-shape. The surfaces 86a and 86b of the cross-roller 83 are held in line contact with the inner and outer races, for rotatably supporting the supported member relative to the supporting post and the like. Numerals 84a, 84b designate dust preventing seals, while numerals 85a and 85b designate bolt-nut combinations which combine the two pieces of the outer race with each other.

On the other hand, the pressing plates are provided for the above described bearings supporting the driving shafts of the first and second arms, respectively, for adjusting the pressures applied to the bearings.

The above described conventional construction requires the bearings of an expensive type such as the cross-roller bearings, and furthermore a pressing plate must be provided for each of the bearings. As a consequence, not only the construction of the device is complicated and the production cost thereof is increased, but also the adjustment of the pressing plate has been troublesome and required much labor.

SUMMARY OF THE INVENTION

A primary object of the present invention is to provide a device for supporting arm driving shafts of an industrial robot wherein the above described difficulties of the conventional device can be substantially eliminated.

Another object of the invention is to provide a device for supporting arm driving shafts of an industrial robot wherein the construction of the bearings can be simplified and the required number of the pressurizing plates can be substantially reduced.

These and other objects of the invention can be achieved by a device for supporting arm driving shafts of an industrial robot having articulations wherein a driving shaft of a first arm and a driving shaft of a second arm are arranged in an axial alignment, bearings are provided for supporting a supporting frame of the first arm and the driving shaft of the second arm on a pair of supporting posts, respectively, and another bearing is provided for supporting an end of the supporting frame of the first arm on the driving shaft of the second arm, characterized in that each of the bearings is made into a .type in which an axial force applied to either one of inner and outer races of the bearing beforehand presses rolling members of the bearing toward the other of the races, a race of a single bearing among these bearings is slidably secured to either one of the driving shaft and the supporting frame, a pressing plate and a plurality of adjusting screws are provided for applying an axial force to the slidably secured race, while the other race of the single bearing and the inner and outer races of other bearings are fixedly secured to their positions.

DESCRIPTION OF THE PREFERRED EMBODIMENTS

Figure 1:
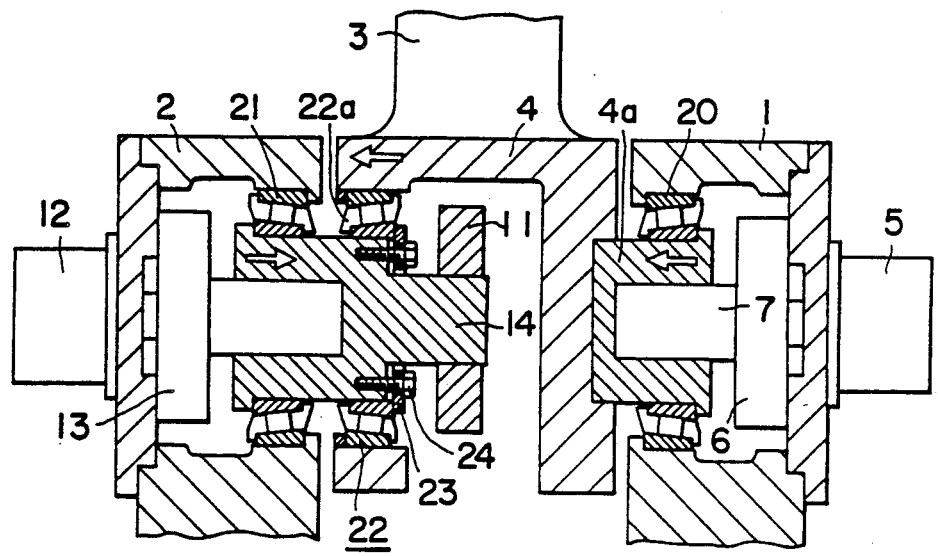
FIG. 1 is a cross-sectional side view showing a first embodiment of this invention.

Various embodiments of the invention will now be described in detail with reference to FIGS. 1 to 4 wherein similar members are designated by similar reference numerals.

Figure 6:
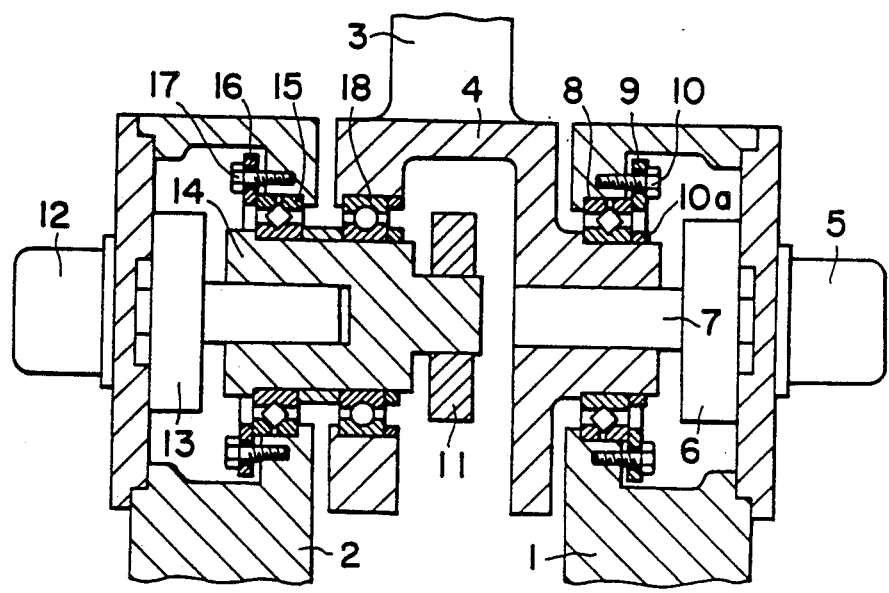
FIG. 6 is a cross-sectional side view taken along the line X—X in FIG. 5.
Figure 6A:
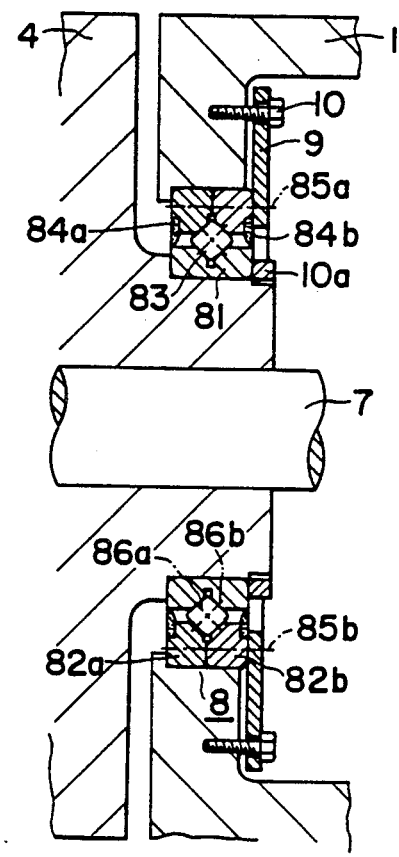
FIG. 6(a) is a cross-sectional side view showing a cross-roller bearing used in the conventional industrial robot.

FIG. 1 illustrates a first embodiment of the invention wherein most of the construction is similar to that shown in FIG. 6. In the shown embodiment, a first bearing 20 provided between a supporting frame 4 of a first arm 3 and a supporting post 1, a second bearing 21 provided between a driving shaft 14 of a second arm 11 and another supporting post 2, and still a third bearing 22 provided between an end of the supporting frame 4 and the driving shaft 14 of the second arm 11 are all formed into taper-roller bearings. In addition, a recessed portion is provided in a surface of the supporting frame 4 facing the supporting post 1, and a supporting ring 4a secured to the output shaft 7 of the speed-reduction mechanism 6 is secured into the recessed portion.

Figure 1A:
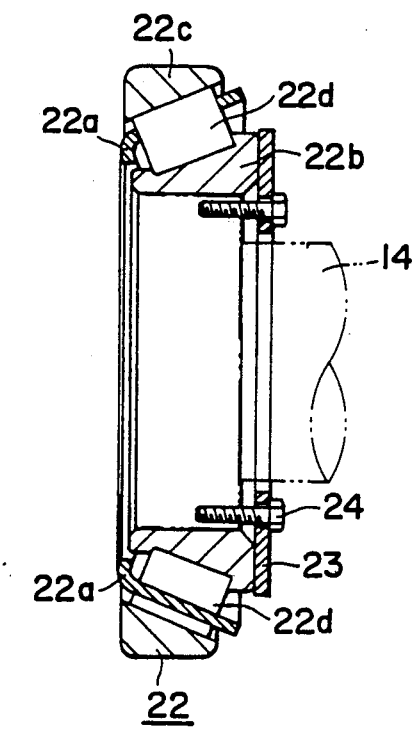
FIG. 1(a) is a cross-sectional side view of a taper roller bearing used in the present invention.

FIG. 1(a) illustrates a construction of the taper-roller bearings.

For instance, in the third bearing 22, numeral 22a designates a grease seal, 22b designates an inner race, and 22c designates an outer race. A plurality of tapered rollers 22d are provided in a tapered groove formed between the inner race 22b and outer race 22c, such that the rollers 22d are rotatable and revolvable.

In the embodiment shown in FIG. 1, the inner race 22b of the third bearing 22 only is made slidable along the driving shaft 14 of the second arm 11, and a pressing plate 23 and a plurality of adjusting screws 24 are provided for beforehand pressing the inner race 22b suitably. The tapered direction of the taper-roller bearing 22 is selected such that when the inner race 22b is shifted by the plate 23 axially, the tapered rollers 22d are urged to the outer race 22c, so that an excessive play of the third bearing 22 can be substantially eliminated. The tapered directions of other roller bearings 20 and 21 are so selected that the direction of the bearing 20 is similar to that of the third bearing 22, while the direction of the second bearing 21 is reverse to that of the third bearing 22.

Accordingly, when the pressing plate 23 is pressed to the inner race of the third bearing 22 by means of the adjusting screws 24, the inner race of the third bearing 22 presses the tapered rollers toward the outer race. The supporting frame 4 secured to the outer race of the third bearing 22 is thus shifted in the arrow-marked direction, thereby shifting the inner race of the first bearing 20 in the arrow-marked direction. As a consequence the tapered rollers of the first bearing 20 are pressed onto the outer race thereof. Pressing of the tapered rollers to the outer race of the third bearing 22 produces a counteracting force that shifts the driving shaft 14 of the second arm 11 in the direction of another arrow mark which is reverse to the first mentioned arrow mark. The inner race of the second bearing 21 secured to the driving shaft 14 is moved together with the driving shaft 14 and presses the tapered rollers of the second bearing 21 onto the outer race of the second bearing 21. In this manner, the three bearings 20, 21 and 22 are all held in a prepressurized condition when the pressing plate 23 urged by the adjusting screws 24 presses the inner race of the third bearing 22 axially.

Figure 2:
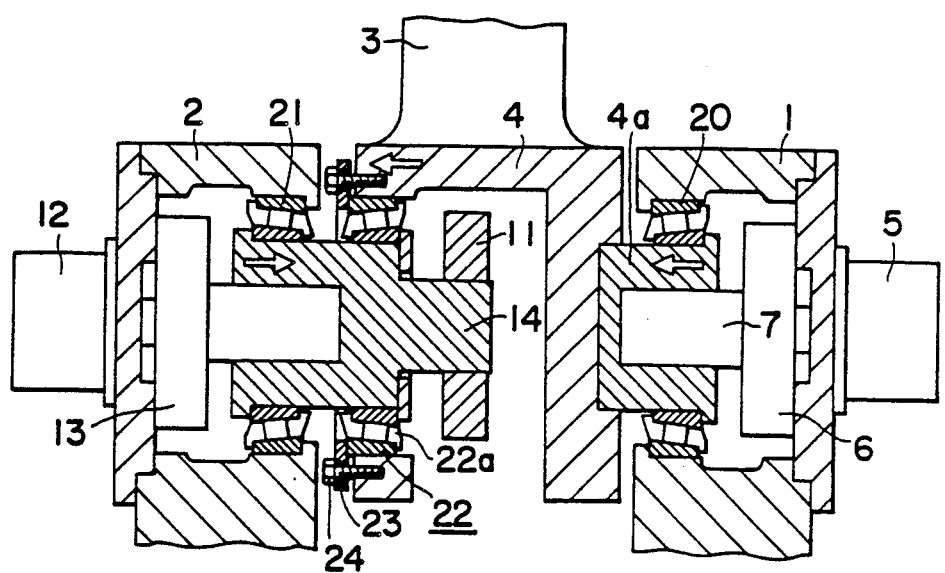
FIG. 2 is a cross-sectional side view showing a second embodiment of this invention.

FIG. 2 illustrates a second embodiment of the invention, wherein the entire construction of the supporting device is substantially similar to that of the first embodiment shown in FIG. 1 except that the inner race of the third bearing 22 is fixedly secured to the outer surface of the driving shaft 14, while the outer race of the same is secured slidably to the supporting frame 4 of the first arm 3. Furthermore, the pressing plate 23 axially pressing the outer race is adjustably secured to the supporting frame 4 by means of adjusting screws 24. With the above described construction, it is apparent that the second embodiment shown in FIG. 2 operates in a manner quite similar to the embodiment shown in FIG. 1.

Figure 3:
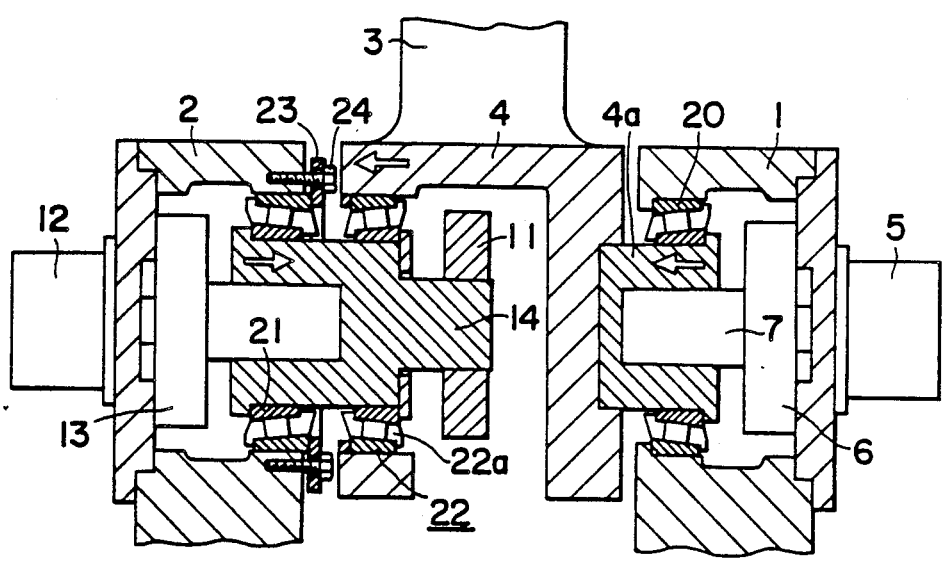
FIG. 3 is a cross-sectional side view showing a third embodiment of this invention.
Figure 4:
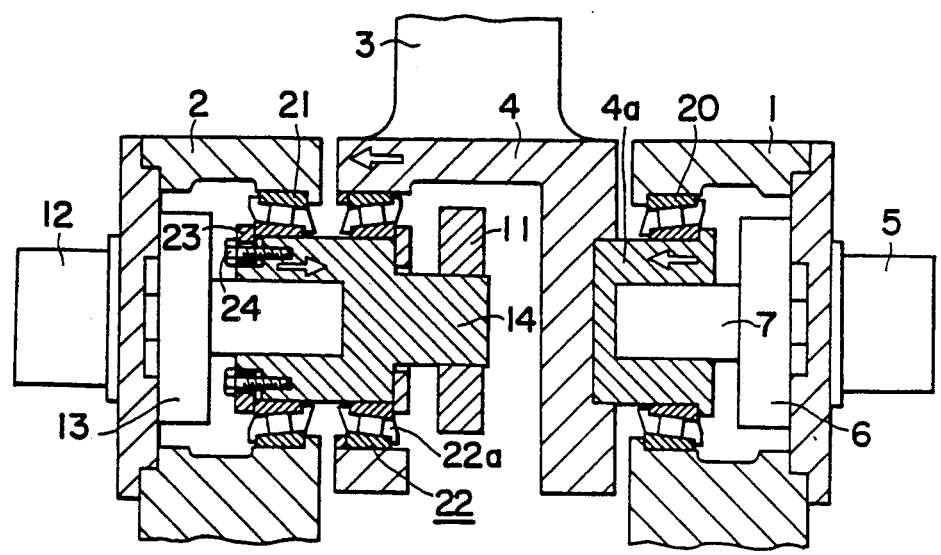
FIG. 4 is a cross-sectional side view showing a fourth embodiment of this invention.
Figure 5:
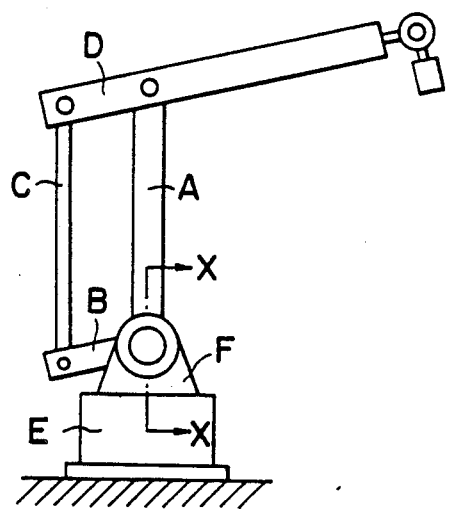
FIG. 5 is a schematic profile view showing a general construction of a conventional industrial robot.

FIGS. 3 and 4 illustrate third and fourth embodiments of this invention which are quite similar to the first embodiment except that the pressing plate 23 and the adjusting screws 24 are provided on the right side and the left side of the second bearing 21, respectively. In the third embodiment, the pressing plate 23 presses the outer race of the second bearing 21 leftwardly, while in the fourth embodiment the pressing plate 23 presses the inner race of the second bearing 21 rightwardly. Although not shown in the drawings, it is apparent that the pressing plate and the adjusting screws may otherwise be provided on the right side or left side of the first bearing 20 for pressing the inner race or outer race of the first bearing 20, respectively.

In such embodiments, it is essential that the tapered directions of the tapered-roller bearings 20, 21 and 22 are determined appropriately according to whatever race of whatever bearing is pressed by the pressing plate and the like in whatever direction.

Furthermore, bearings 20, 21 and 22 are not necessarily limited to the taper roller bearings, and ordinary ball bearings may also be used in the invention so far as either one of the races thereof can press the rolling members toward the other of the races.

What is claimed is:

1. A device for supporting arm-driving shafts of an industrial robot having articulations wherein a driving shaft of a first arm and a driving shaft of a second arm are arranged in an axial alignment, first and second bearings are provided for supporting a supporting frame of the first arm and the driving shaft of the second arm on a pair of supporting posts, respectively, and a third bearing is provided for supporting an end of the supporting frame of the first arm on the driving shaft of the second arm, characterized in that each of said bearings is made into a type in which an axial force applied to either one of inner and outer races of the bearings beforehand presses rolling members of the bearings toward the other of the races, a race of a single bearing among these bearings is slidably secured to either one of the driving shaft and the supporting frame, a pressing plate and a plurality of adjusting screws are provided for applying an axial force to the slidably secured race, while the other race of the single bearing and the inner and outer races of other bearings are fixedly secured to their positions.

2. The device for supporting arm-driving shafts of an industrial robot according to claim 1 wherein the pressing force applied by said pressing plate is made adjustable.

3. The device for supporting arm-driving shafts of an industrial robot according to claim 1 wherein all the bearings are made into taper roller bearings.

4. The device according to claim 1 wherein said pressing plate is provided only for said third bearing supporting one end of said supporting frame, so that it presses the inner race of said third bearing axially away from the supporting frame.

5. The device according to claim 1 wherein said pressing plate is provided only for said third bearing supporting one end of said supporting frame, so that it presses the outer race of said third bearing axially toward said supporting frame.

6. The device according to claim 1 wherein said pressing plate is provided only for the second bearing supporting said driving shaft of said second arm on one of said supporting posts, so that it presses the outer race of said second bearing axially away from said supporting frame.

7. The device according to claim 1 wherein said pressing plate is provided only for the second bearing supporting said driving shaft of said second arm on one of said supporting posts, so that it presses the inner race of said second bearing axially toward said supporting frame.

* * * * *